(12) United States Patent
Lyu

(10) Patent No.: US 9,926,857 B2
(45) Date of Patent: Mar. 27, 2018

(54) ONE SAFETY CONTROL DEVICE FOR PETROL POST HOLE DIGGER

(71) Applicant: Junifeng International Co., Limited, Qingdao (CN)

(72) Inventor: Bill Hongwen Lyu, Qingdao (CN)

(73) Assignee: JUNIFENG INTERNATIONAL CO., LIMITED, Qingdao (CN)

( * ) Notice: Subject to any disclaimer, the term of this patent is extended or adjusted under 35 U.S.C. 154(b) by 14 days.

(21) Appl. No.: 15/108,289

(22) PCT Filed: Dec. 29, 2014

(86) PCT No.: PCT/CN2014/095373
§ 371 (c)(1),
(2) Date: Jun. 25, 2016

(87) PCT Pub. No.: WO2015/101262
PCT Pub. Date: Jul. 9, 2015

(65) Prior Publication Data
US 2016/0319752 A1 Nov. 3, 2016

(30) Foreign Application Priority Data

Dec. 31, 2013 (CN) .......................... 2013 2 0896596

(51) Int. Cl.
*F02D 11/00* (2006.01)
*F02D 11/04* (2006.01)
(Continued)

(52) U.S. Cl.
CPC .............. *F02D 11/04* (2013.01); *E21B 12/00* (2013.01); *F02B 63/02* (2013.01); *F02D 11/02* (2013.01);
(Continued)

(58) Field of Classification Search
CPC ........ F02D 11/02; F02D 11/04; F02D 11/107; E21B 11/005; E21B 12/00
(Continued)

(56) References Cited

U.S. PATENT DOCUMENTS 4,947,814 A * 8/1990 Villanyi .................... F02D 9/02
123/365
4,959,906 A * 10/1990 Moore, Jr. .......... B27B 17/0008
123/198 D
(Continued)

*Primary Examiner* — Thomas Moulis
(74) *Attorney, Agent, or Firm* — Platinum Intellectual Property LLP

(57) ABSTRACT

This utility type patent publishes a safety control device for petrol post hold digger. It includes an operation frame, respective handles in the opposite two sides of the frame; one is throttle control handle in the right side and another is balance control handle in the left side. The safety control device is mounted on the above of the frame near left side, connected with engine in the middle place of the operation frame by one cable, with the throttle control handle in the right side by another cable. A long touch rod is installed underneath the safety control device, sticking outside of the operation frame to position A as shown in bellow picture. When post hole digger is used, drill bit is driven into soul at clockwise direction. If the drill bit touches big roots or rocks and stops rotation in a sudden, all the inertia and torque from still running engine will be thrown to the operation frame, makes it turn to opposite anticlockwise direction. Then the touch rod, usually sticking out of the frame at position A, will turn to touch leg and rotate in a certain angle towards position B. Detecting this angle change, the safety control device will act and reduce the engine torque by releasing its throttle cable to get a lower speed. As a result, to avoid the operator's danger of falling down, make the machine always operate under comfortable control.

(Continued)

Figure 1:
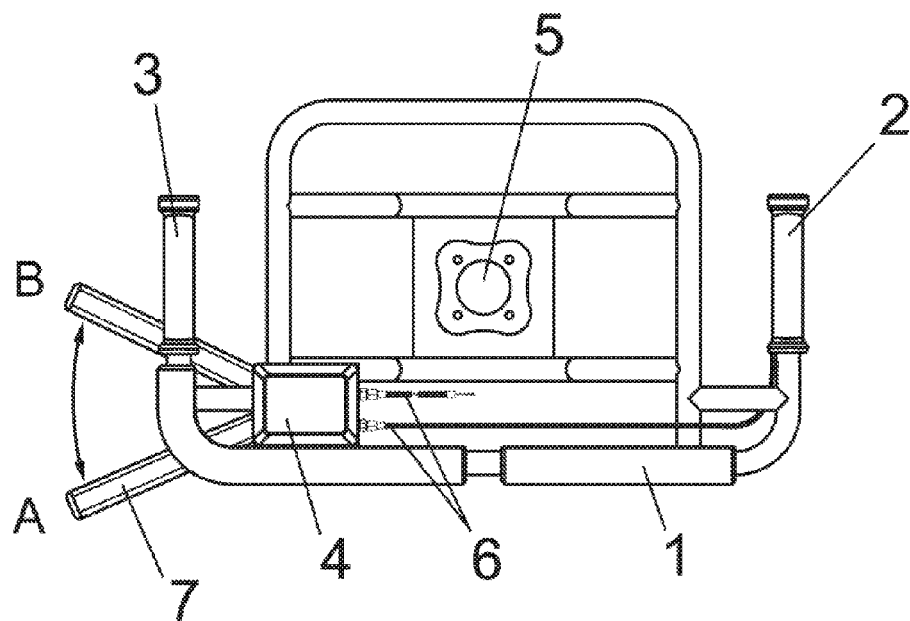
Figure 2:
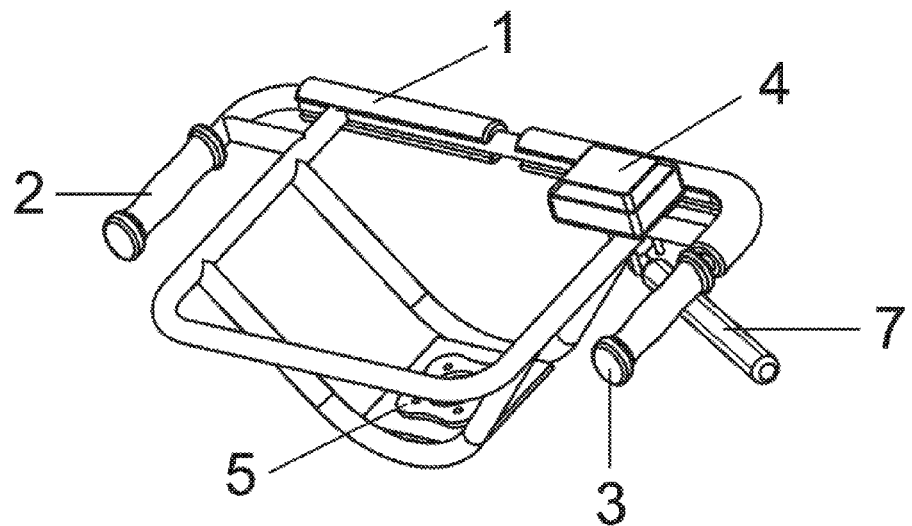

This patent is designed to be safe in operation, simple in structure and high practical in use.

4 Claims, 1 Drawing Sheet

(51) Int. Cl.
| | |
|---|---|
| *F02D 41/02* | (2006.01) |
| *F02D 41/22* | (2006.01) |
| *F02B 63/02* | (2006.01) |
| *F02D 11/02* | (2006.01) |
| *F02D 11/10* | (2006.01) |
| *E21B 12/00* | (2006.01) |
| *E21B 11/00* | (2006.01) |

(52) U.S. Cl.
CPC ............ *F02D 11/10* (2013.01); *F02D 11/107* (2013.01); *F02D 41/021* (2013.01); *F02D 41/22* (2013.01); *E21B 11/005* (2013.01); *Y02T 10/40* (2013.01)

(58) Field of Classification Search
USPC .......................................................... 123/377
See application file for complete search history.

(56) References Cited

U.S. PATENT DOCUMENTS

| | | | | |
|---|---|---|---|---|
| 5,076,411 | A * | 12/1991 | Kramer | B27B 17/0008 123/198 D |
| 5,724,737 | A * | 3/1998 | Stones | B27B 17/0008 192/131 R |
| 5,842,277 | A * | 12/1998 | Haberlein | A01G 3/062 173/171 |
| 6,082,087 | A * | 7/2000 | Tada | A01D 34/902 56/255 |
| 6,108,867 | A * | 8/2000 | Nagashima | F02D 11/02 16/110.1 |
| 6,708,773 | B1 * | 3/2004 | Kinkead | A01B 33/082 172/21 |
| 8,733,477 | B1 * | 5/2014 | Cook | A01D 34/824 172/42 |
| 9,162,352 | B2 * | 10/2015 | Rudolf | B25F 5/00 |
| 9,591,796 | B2 * | 3/2017 | Bryant | A01B 76/00 |
| 9,616,893 | B2 * | 4/2017 | Bejcek | B60W 30/18009 |
| 2002/0092179 | A1 * | 7/2002 | Kobayashi | A01D 34/90 30/276 |
| 2009/0119933 | A1 * | 5/2009 | Mace | A01G 3/08 30/381 |
| 2010/0199949 | A1 * | 8/2010 | Tamura | A01G 3/047 123/334 |
| 2012/0103641 | A1 * | 5/2012 | Kinkead | A01B 45/02 172/22 |

* cited by examiner

ONE SAFETY CONTROL DEVICE FOR PETROL POST HOLE DIGGER

TECHNICAL FIELD

This utility type patent relates to machinery construction technology, particularly in safety control device for petrol post hole digger.

TECHNICAL BACKGROUND

Petrol post hole digger is a kind of engine machine, designed for garden cultivation, tree planting, post hole digging etc. It saves human labor and increases efficiency. Common petrol post hole diggers only suit for working in even, soft soil ground. If in the process encountering big tree roots or rocks, the drill bit will have a sudden stop which will throw all the inertia and engine torque to operator. Facing this situation, in natural the operator will hold handles firmly and try to control the machine, its much easier to rotate together with the frame and fall down. This is a big safety risk.

Some diggers are built in buffer structure between engine spindles and working drill bits to mitigate the impact force, the results are not satisfactory. Some add brake device in the engine output spindle, relying on friction to reduce the torque transmit. Disadvantage is clutch slipping is very often and heat is made on the friction surface, affect the life time of machines, also not a good idea.

PATENT CONTENT OF THIS UTILITY TYPE

Against the problems in the current machines, the patent, safety control device for petrol post hole digger, supplies a solution of reasonable design, comfortable operation.

It includes an operation frame, respective handles in the opposite two sides of the frame; one is throttle control handle in the right side and another is balance control handle in the left side. The safety control device is mounted on the above of the frame near left side, connected with engine in the middle place of the operation frame by one cable, with the throttle control handle in the right side by another cable. A long touch rod is installed underneath the safety control device, sticking outside of the operation frame towards position A.

When post hole digger is used, drill bit is driven into soul at clockwise direction. If the drill bit touches big roots or rocks and stops rotation in a sudden, all the inertia and torque from still running engine will be thrown to the operation frame, makes it turn to opposite anticlockwise direction. Then the touch rod, usually remains in position A, will turn to touch leg and rotate in a certain angle to position B. Detecting this angle change, the safety control device will act and reduce the engine torque by releasing its throttle cable to get a lower speed. As a result, to avoid the operator's danger of falling down, make the machine always operate under comfortable control.

When touch rod reach in position B, throttle cable is fully released, engine will rotate in idle speed. Clutch is no engagement so no torque transmit to the drill bit, in consequence the operator will control it easily and regain balance.

When the operation frame returns to original position, the touch rod will automatically return to its position A, machine can work again.

By reducing fuel supply to get lower engine speed, reduce engine torque to solve the sudden stop, helps the operator to regain balance also protect the machine itself to extend its service life.

FIGURE ILLUSTRATION

Picture 1: Top view diagram of the utility structure
Picture 2: Isometric view diagram of the utility structure
In pictures,
1. Operation Frame
2. Throttle control handle
3. Balance control handle
4. Safety control device
5. Engine mount position
6. Throttle cables
7. Touch rod
A. Touch rod original position
B. Touch rod max position

DETAILED DESCRIPTION WITH PICTURE 1 &2

One safety control device for petrol post hole digger.

It includes an operation frame 1, respective handles in the opposite two sides of the frame; one is throttle control handle 2 in the right side and another is balance control handle 3 in the left side. The safety control device 4 is mounted on the above of the frame near left side, connected with engine in the middle place 5 of the operation frame by one cable 6, with the throttle control handle 2 in the right side by another cable 6. A long touch rod 7 is installed underneath the safety control device 4, sticking outside of the operation frame 1 to position A.

When post hole digger is used, drill bit is driven into soul at clockwise direction. If the drill bit touches big roots or rocks and stops rotation in a sudden, all the inertia and torque from still running engine will be thrown to the operation frame 1, makes it turn to opposite anticlockwise direction. Then the touch rod 7, usually remains in position A, will turn to touch leg and rotate in a certain angle towards position B. Detecting this angle change, the safety control device 4 will act and reduce the engine torque by releasing its throttle cable 6 to get a lower speed. As a result, to avoid the operator's danger of falling down, make the machine always operate under comfortable control.

When touch rod 7 is in position B, throttle cable 6 is fully released, engine will rotate in idle speed. Clutch is no engagement so no torque transmit to the drill bit, in consequence the operator will control it easily and regain balance.

When the operation frame 1 returns to original position, the touch rod 7 will automatically return to its original position A, the post hole digger machine can work again.

The invention claimed is:
1. A petrol post hold digger, comprising:
an engine;
a U-shaped operation frame having a throttle control handle on one side and a balance handle on the other side;
a safety control device mounted on the U-shaped operation frame, the safety control device configured to be connected to the throttle control handle and the engine via a throttle cable; and
a touch rod flexibly attached to the safety control device, wherein, when the petrol post hold digger meets a heavy object, the touch rod is autonomously pushed by an operator from a first position to a second position so that the throttle control handle reduces the engine's speed.

2. The petrol post hold digger of claim 1, wherein the touch rod is configured to adjust the engine to an idle speed.

3. The petrol post hold digger of claim 1, wherein, when the petrol post hold digger is free from the heavy object, the touch rod automatously returns to the first position and the engine resumes a regular speed.

4. The petrol post hold digger of claim 1, wherein the throttle control is configured to adjust fuel supply to the engine.

\* \* \* \* \*